United States Patent

[11] 3,611,839

[72] Inventors Vladimir Viktorovich Idel
 ulitsa Graftio, 15, kv. 6;
 Jury Vasilievich Tishin, ulitsa Michurina, 26, kv. 12, both of Zavolzhie Gorkovskoi Oblasti, U.S.S.R.
[21] Appl. No. 22,326
[22] Filed Mar. 24, 1970
[45] Patented Oct. 12, 1971
[32] Priority Dec. 8, 1969, Jan. 12, 1970
[33] U.S.S.R.
[31] 1378202 and 1387555

[54] BANDSAW-SHARPENING MACHINE
 3 Claims, 5 Drawing Figs.
[52] U.S. Cl. .................................................... 76/37,
 76/41, 76/43, 76/112
[51] Int. Cl. ...................................................... B23d 63/12
[50] Field of Search .......................................... 76/37, 40,
 41, 42, 43, 112, 33

[56] References Cited
 UNITED STATES PATENTS
 2,379,642 7/1945 Kiechle ....................... 76/41
 2,434,691 1/1948 Fields .......................... 76/37

Primary Examiner—Bernard Stickney
Attorney—Waters, Roditi, Schwartz & Nissen

ABSTRACT: The invention relates to a bandsaw-sharpening machine comprising a rotating abrasive wheel, a mechanism for pitch feed of the saw with relation to the abrasive wheel, and a mechanism for working feed of the saw towards the abrasive wheel, said mechanisms being installed rotatably in the plane of the saw for ensuring the resetting of the machine to suit the value of the front tooth-sharpening angle, and a clamping device mounted with a provision for being transferred along the saw on the working feed mechanism for resetting the machine to suit the shape of the teeth of the saws being sharpened.

BANDSAW-SHARPENING MACHINE

The present invention relates to the bandsaw-sharpening machines and more particularly it relates to the machines in which the saw is sharpened in a "floating" position.

Known from the earlier applications by the same applicant are such machines comprising a rotating abrasive wheel installed on the machine bed, a mechanism for pitch saw feed relative to the abrasive wheel, and a mechanism for working feed of the saw onto the abrasive wheel, said mechanism carrying a saw-clamping device formed by a spring-loaded stop at the back side of the saw, two stationary stops at the tooth side of the saw and two spring-loaded stops holding the saw from the sides.

Such clamping of the saw allows it to "float" in the process of sharpening, i.e., to turn somewhat in its plane with relation to one of the stationary stops located at the tooth side and to move progressively in the direction contrary to the pitch feed.

Practical experience has proved the advantages of the machines with a "floating" clamping of the saw as compared with the known machines with the rigidly clamped saw.

The sharpening speed in the machine rises to 400 teeth per minute and over, the quality of sharpening being somewhat improved too.

However, resetting of the known machines for sharpening the saws with different shapes of the teeth is difficult because it involves the use of several types of saw-clamping devices.

Besides, the known machines are not adapted for joint sharpening and setting of the endless bandsaws with a large tooth-sharpening front angle because when the saw is set for the required front-sharpening angle, the sides of the saw become so displaced that the latter cannot be inserted into the setting mechanism.

An object of the invention is to eliminate the aforesaid disadvantages.

To accomplish this object, the author hereby claims a machine which is more versatile with regard to resetting owing to a new layout of the working and pitch feed mechanisms and of the clamping device.

The machine of the present invention comprises a rotating abrasive wheel installed on the machine bed, a mechanism for pitch feed of the saw with relation to the abrasive wheel and a mechanism for working feed of the saw onto the abrasive wheel, said mechanism carrying the saw-clamping device; said device allows the saw to be turned in its plane and moved progressively to a certain extent in the direction contrary to the pitch feed. According to the invention, the improvement consists in that the mechanisms of working and pitch feeds of the saw are installed with a provision for being turned through a certain angle in the plane parallel to the saw, said angle being determined by the front tooth-sharpening angle, that they have devices for locking them on the bed in the required position, and that the clamping device is adapted for being transferred on the working feed mechanism along the saw.

In one version it is suggested to install the working and pitch feed mechanisms on a common turnplate which is rotatably installed on the bed parallel to the saw surface and is provided with a device for locking it in the required position on the bed after turning.

In another version it is suggested to install the working and pitch feed mechanisms on separate turnplates which are mounted on the bed with a provision for turning relative to each other and parallel to the saw surface, and have devices for locking them on the bed in the required position after turning.

This improvement facilitates considerably the resetting of the machine.

In this case saws with different shapes of teeth can be sharpened by only one clamping device, setting it in the required position along the saw, whereas the known machines must have a number of replaceable clamping devices, used, each, for a definite shape of the saw teeth.

By turning the working and pitch feed mechanisms with rotation to the bed it is always possible to set the saw sides parallel to each other thereby ensuring simultaneous sharpening and setting of the saw.

The invention will become more apparent from the description of its embodiments and accompanying drawings, in which.

Figure 1:
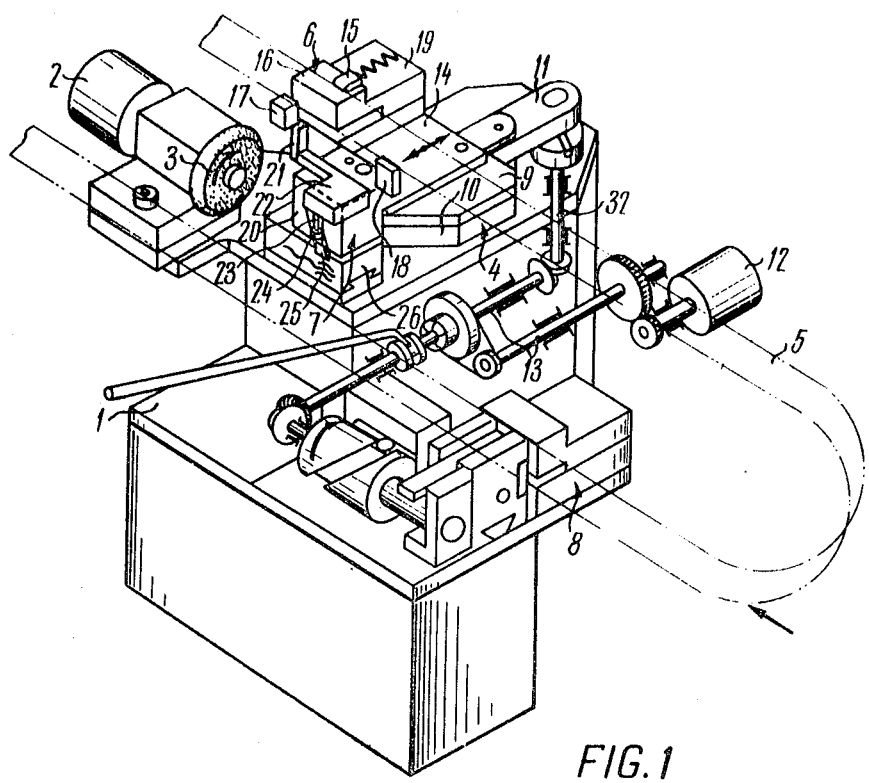
FIG. 1 shows the machine of the present invention in axonomic projection and its general diagram of mechanism.

As shown in FIG. 1 the machine of the invention comprises a bed 1 divided vertically into two platforms, the upper platform carrying a sharpening stock 2 with the rotating abrasive wheel 3 and a mechanism 4 for the working feed of the saw 5 onto the abrasive wheel 3 with a clamping device 6 for holding the saw 5, and a mechanism 7 for pitch feed of the saw with relation to the abrasive wheel 3, all these units forming the sharpening assembly.

The lower platform of the bed 1 mounts an impact-setting mechanism 8 of any known design which is not dealt with herein as irrelevant.

One side of the saw 5 to be sharpened is passed through the sharpening assembly and its other side, through the setting mechanism 8 as can be seen in FIG. 1.

The working feed mechanism 4 comprises a slide 9 which is reciprocated in the guides (not shown) of the base 10 by a crank mechanism 11 the latter being rotated by a motor 12 via a kinematic chain 13. The slide 9 carries a plate 14 to which the clamping device 6 of the saw 5 is secured.

The clamping device 6 comprises a spring-loaded stop 15 (FIG. 1 and 2) at the back side of the saw 5, two spring-loaded side stops 16 (upper and lower ones) and two stationary stops 17 and 18 at the tooth side of the saw.

Figure 2:
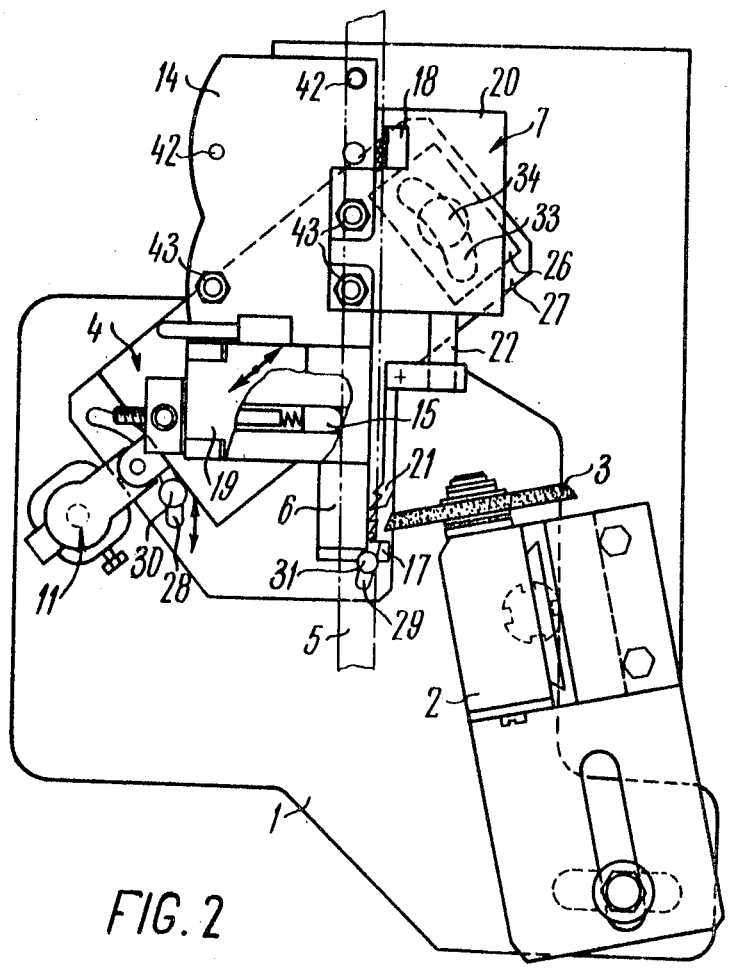
FIG. 2 is a top view of the machine with the working and pitch feed mechanisms mounted on a common turnplate.
Figure 5:
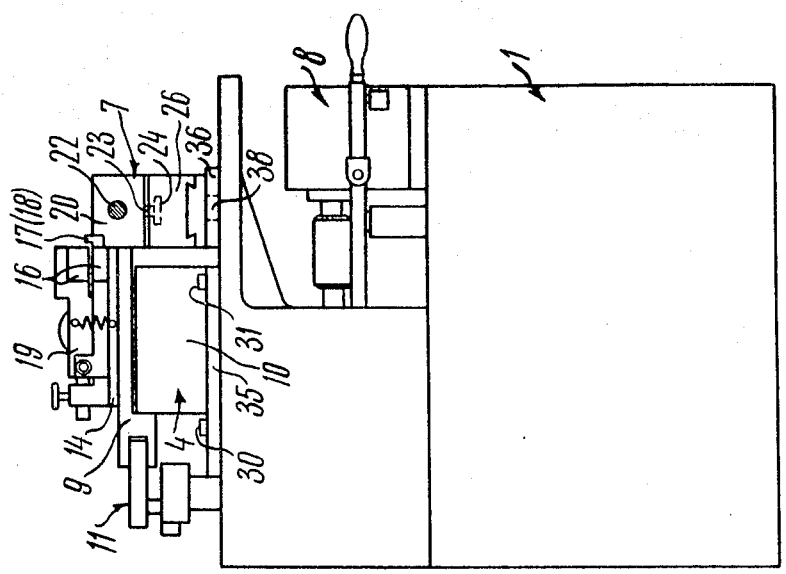
FIG. 5 is a side view of the machine shown in FIG. 4.
Figure 3:
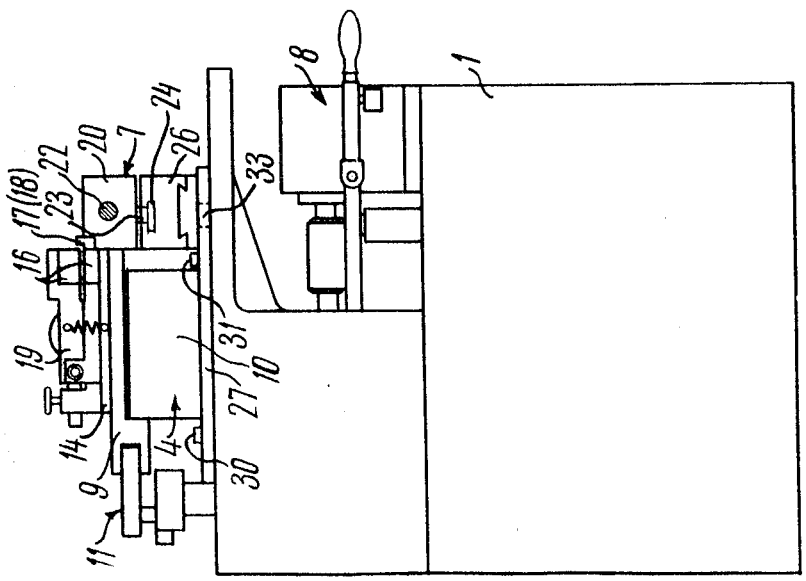
FIG. 3 is a side view of the same machine shown in FIG. 2.
Figure 4:
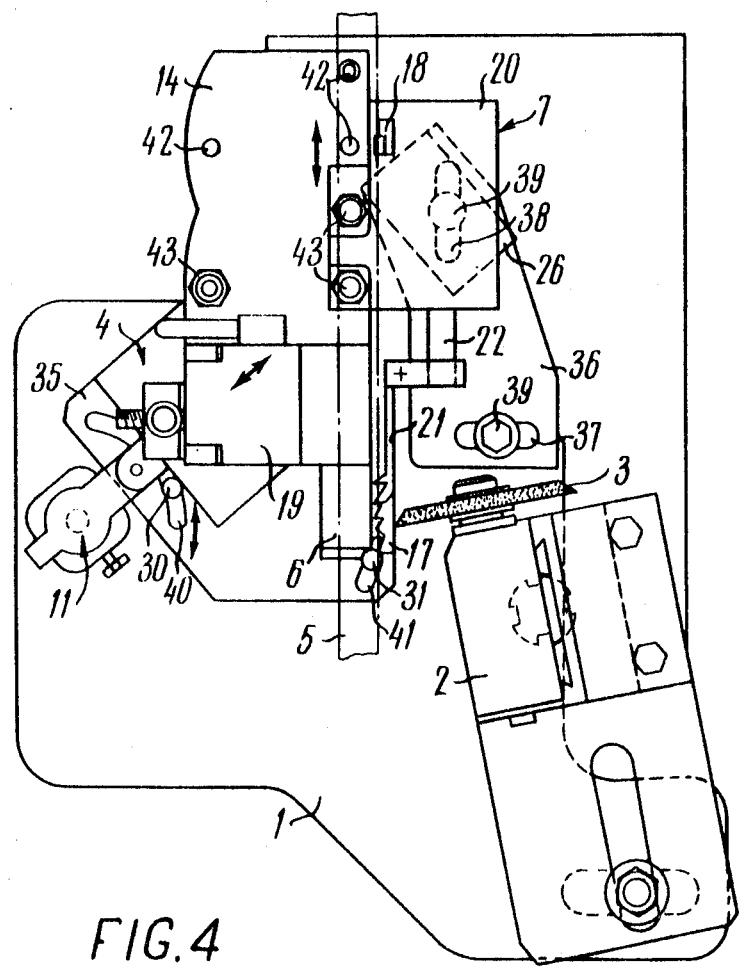
FIG. 4 is a top view of the machine with the working and pitch feed mechanisms mounted on separate turnplates.

The saw 5 is set between the stop 15 and the stops 17, 18, being guided during its feed by the stops 16. All these stops except stop 18 are mounted in the housing 19 of the clamping device 6 whereas the stop 18 is installed on the body 20 of the pitch feed mechanism 7 as shown in FIGS. 1, 2 and 4.

Owing to the provision of the spring-loaded stop 15, the saw 5 can turn in its plane during sharpening through a certain preset angle with relation to one of the stops 17 or 18, depending on the relative positions of the abrasive wheel 3 and stop 15, and move progressively over a certain distance in the direction contrary to the pitch feed. If the abrasive wheel 3 is located in front of the stop 15 in the direction of the pitch feed of the saw, the latter will turn with relation to the stop 17.

If the abrasive wheel 3 is set behind the stop 15 in the direction of the pitch feed of the saw, the latter will turn with relation to the stop 18.

The pitch feed mechanism 7 of the saw 5 is provided with a pawl 21 which engages periodically the teeth of the saw 5, and is reciprocating and swinging simultaneously. Such a complex motion of the pawl 21 is ensured by securing it on the slide 22 (FIGS. 1 through 5) which moves in the guides (not shown) of the body 20 of the mechanism 7, the latter being fastened to the plate 14 of the slide 9, said plate supporting the clamping device 6.

At the same time the slide 22 has a vertical pivot 23 with a roller 24 which enters the slot 25 arranged at an angle to the saw 5 and located in the plate 26 fastened to the bed 1.

Thus, the working feed of the saw 5 onto the abrasive wheel 3 as well as the pitch feed is ensured by the operation of the crank mechanism 11.

To reset the machine for simultaneous sharpening and setting of the saw teeth, the base 10 of the mechanism 4 and the plate 26 of the mechanism 7 are secured in one version of the invention on a common turnplate 27 (FIGS. 2 and 3) which has curved slots 28 and 29 for the fastening bolts 30 and 31 intended to fix the plate 27 in the required position on the bed 1. The plate 27 is installed parallel to the plane of the saw 5.

By turning this plate 27 in its slots 28 and 29 with relation to the bolts 30 and 31, around the pivot 32 of the crank mechanism 11, and simultaneously, the working and intermittent feed mechanisms 4 and 7, said mechanisms are thus oriented to suit the front-sharpening angle of the teeth of the saw 5.

Then the plate 14 of the slide 9 is turned together with the clamping device 6 and with the body 20 of the mechanism 7 until the upper side of the saw 5 is brought precisely above the lower side. It is obvious that this will displace the clamping device 6 with relation to the pawl 21 of the pitch of feed mechanism 7. Therefore, to make the pawl 21 engage the saw 5, the plate 26 is moved in the curved slot 33 of the baseplate 27 and fixed in the required position by bolt 34.

If there is a large difference of the front tooth-sharpening angles (from 0° to 40°), it is practicable that the turnplate 27 be replaced by two separate plates 35 and 36 which are rotatable in the plane of the saw (FIGS. 4 and 5), installing the base 10 of the mechanism 4 on the plate 35, and the plate 26 of the mechanism 7, on the plate 36.

The plate 36 has perpendicular slots 37 and 38 with the fastening bolts 39 passing through them, while the plate 35 has slots 40 and 41 (analogous to the slots 28 and 29 in the plate 27) with bolts 30 and 31 passing through them.

While sharpening the saws with the teeth of different shape, i.e., while changing from sharpening the saws with the teeth whose long side is inclined in the direction of the pitch feed of the saw to sharpening the saws with the long side of the teeth inclined against the pitch feed of the saw, it is also necessary to reset the machine in order to increase the quality and speed of tooth sharpening to a maximum.

This resetting is accomplished by transferring the clamping device 6 with relation to the abrasive wheel 3 along the saw, i.e., by changing the relative positions of the stop 15 of the clamping device 6 and of the abrasive wheel 3 which has been mentioned above.

For this purpose the plate 14 of the working feed 4 has a number of holes 42 for the fastening bolts 43 which fix the clamping device 6 in the required position.

Thus, the stop 15 must be installed in front of the abrasive wheel 3 in the direction of the pitch feed when the saw has teeth with their long side inclined against the direction of pitch feed; conversely, the stop 15 must be installed behind the abrasive wheel 3 in the direction of pitch feed when the long side of the saw teeth points in the opposite direction.

The invention facilitates considerably the resetting of the machine and increases its output.

Though the machine is intended for sharpening bandsaws, it can be used for sharpening other cutting tools for which purpose another type of the clamping device must be provided.

We claim:

1. A bandsaw-sharpening machine comprising: a bed of said machine, an abrasive wheel mounted on said bed, a means for rotating said abrasive wheel, a mechanism for pitch feed of the saw with relation to the abrasive wheel, a mechanism for working feed of the saw towards said abrasive wheel, both mechanisms being installed on the bed with a provision for forced turning through a certain angle in the plane parallel to the saw, said angle being determined by the front tooth-sharpening angle and having a means for their fixing on the bed in the required position after turning, a saw-clamping device allowing the saw to be turned during sharpening in its plane and to be moved progressively in the direction contrary to the pitch feed; said clamping device is installed on said working feed mechanism and is adapted for being moved on this mechanism along the saw.

2. A machine according to claim 1 wherein the working and pitch feed mechanisms are mounted on a common turnplate installed rotatably on the machine bed parallel to the saw plane and provided with a device for fixing it on the bed in the required position after turning.

3. A machine as claimed in claim 1 wherein the working and pitch feed mechanisms are mounted on separate turnplates installed rotatably with relation to each other in the machine bed, and parallel to the saw plane, and provided with devices for fixing them on the bed in the required position after turning.